April 18, 1967 E. GSCHWANDTNER 3,315,037
STEREOPHONIC DECODER FOR FREQUENCY MODULATED SIGNALS
Filed Feb. 1, 1965
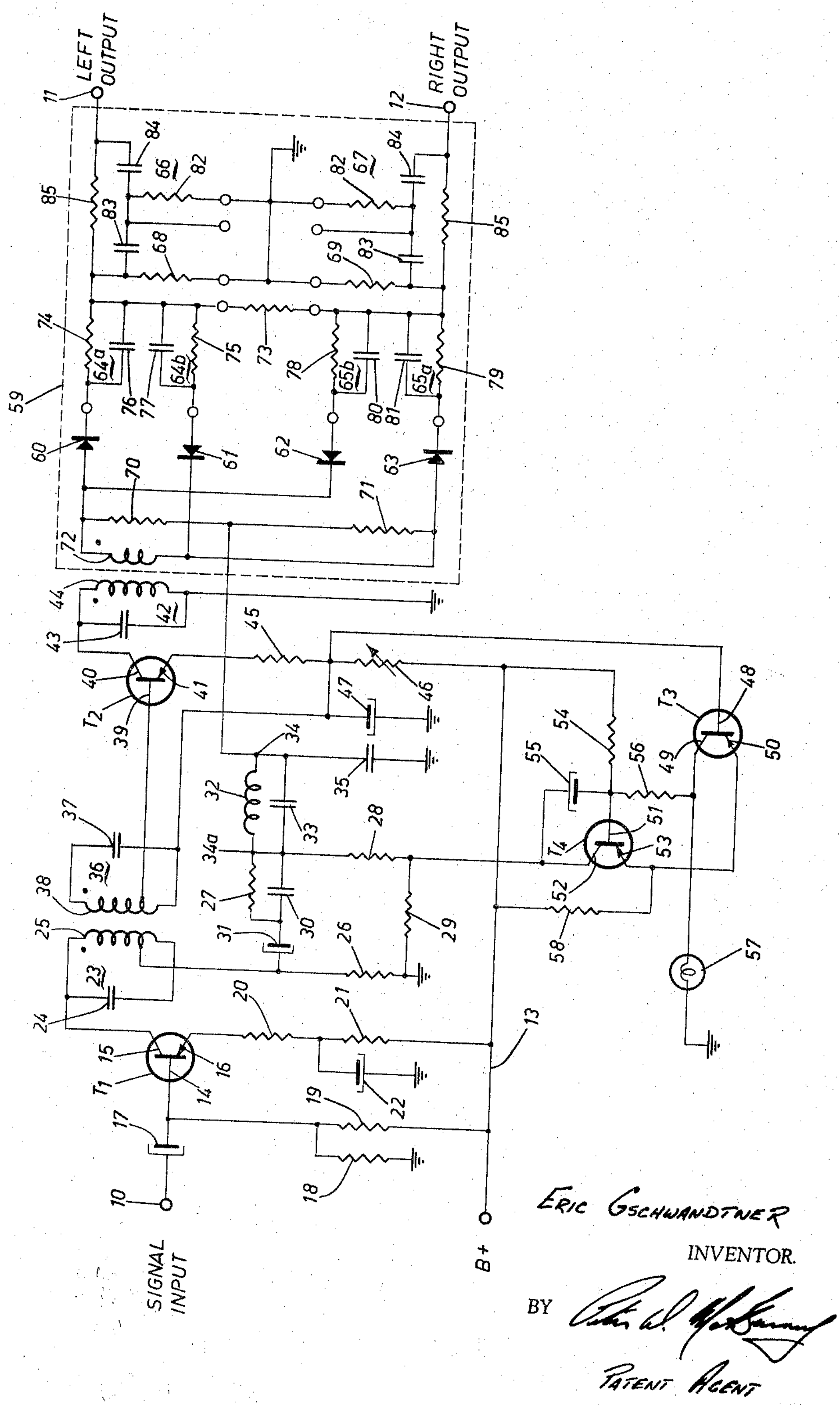
ERIC GSCHWANDTNER
INVENTOR.
BY [signature]
PATENT AGENT 3,315,037

STEREOPHONIC DECODER FOR FREQUENCY MODULATED SIGNALS

Eric Gschwandtner, Rexdale, Ontario, Canada, assignor to Dominion Electrohome Industries Limited, Kitchener, Ontario, Canada Filed Feb. 1, 1965, Ser. No. 429,421
Claims priority, application Canada, Feb. 1, 1964, 894,625
11 Claims. (Cl. 179—15)

This invention relates to an FM stereophonic decoder for use in an FM receiver adapted to receive both FM monophonic and multiplex signals and capable of separately reproducing the two different sound signals in a transmitted FM multiplex signal.

In accordance with regulations currently prescribed by the F.C.C. in the United States and D.O.T. in Canada, the composite signal for use in FM multiplex transmission must have the following mathematical form:

$$M(t)=(L+R)+(L-R)\cos wt+P\cos \frac{w}{2}t$$

where

M(t) is the composite signal
L is the left channel audio signal
R is the right channel audio signal
P is the pilot carrier amplitude
$W=2\pi f$, $f$ presently being 38 kc./s.

In the foregoing equation, $(L+R)$ is the sum of the left and right audio channel signals and, therefore, is called the monophonic signal. An FM receiver which is not equipped to reproduce stereophonic signals will produce the $(L+R)$ signal only. $(L-R)\cos wt$ represents the difference between the left and right audio channel signals amplitude modulated onto a 38 kc./s. carrier which is suppressed prior to transmission of the composite signal. The difference signal is called the stereophonic signal.

$$P\cos \frac{w}{2}t$$

is a 19 kc./s. pilot carrier.

It will be noted that the amplitude modulated carrier (38 kc./s.) is harmonically related to the pilot carrier (19 kc./s.), the frequency of the latter being exactly one half of the frequency of the former. The pilot carrier is a necessary part of the composite signal, since it serves the function of reintroducing the suppressed 38 kc./s. carrier into the composite signal in the FM multiplex receiver. It can be said that the pilot carrier is a synchronization signal for the correct decoding of the composite signal at the receiver.

In addition to the foregoing components, the composite signal may contain an S.C.A. signal for store casting or subscription music transmission, the use of this signal by the broadcaster being optional. The bandwidth of the S.C.A. channel presently is 67±7 kc./s.

The monophonic signal can frequency modulate the FM broadcast carrier up to 80%, if S.C.A. is present, or up to 90% with no S.C.A., of the maximum modulation (±75 kc./s.) permitted by the F.C.C. and D.O.T. regulations. The stereophonic signal also can modulate up to 80% with both side bands, or 40% with each side band, of the maximum modulation if S.C.A. is present, these figures being 90% and 45% respectively with no S.C.A. The pilot carrier modulates up to 10%, i.e. ±7.5 kc./s. assuming 100% modulation to be ±75 kc./s. Thus, for FM multiplex transmission present regulations require an RF signal which may be modulated by the following signals in the noted frequency bands:

$L+R$ from 0 to 15 kc./s.

$L-R$ in the form of ±(0 to 15) kc./s. sidebands of 38 kc./s. sub-carrier with carrier suppressed and in the band 23 to 53 kc./s.

A pilot carrier at 19 kc./s.

A subsidiary carrier (S.C.A.) having a bandwidth from 60 to 74 kc./s.

In an FM multiplex receiver a decoder must be provided to derive the audio L and R signals and separate them from each other for individual reproduction. The decoder also should be capable of automatically adjusting itself for the reception of ordinary monophonic FM or FM multiplex signals, and preferably a visual indication of the type of signal being received by the decoder should be given.

Accordingly, it is an object of this invention to provide, in an FM receiver, a stereophonic decoder for the detection of ordinary monophonic FM or FM multiplex signals, and which functions in such a manner that it automatically adjusts itself for the type of signal being being received. The decoder preferably is provided with a visual indicating device such as a lamp which indicates when an FM multiplex signal is being received.

The nature of this invention will be apparent from the following detailed description, taken in conjunction with the appended figure, which is a circuit diagram of a preferred stereophonic decoder embodying this invention.

Referring to the drawing, there is shown a stereophonic decoder having a signal input terminal 10, to which the signal received by the FM receiver is applied after having been conducted through the conventional stages of the receiver prior to the stereophonic decoder, and left and right channel audio signal output terminals 11 and 12 respectively, at which the two audio signals in an FM multiplex input signal appear separately.

A source of positive potential (B+) is provided and is connected to a conductor 13.

A transistor $T_1$ and associated circuitry constitutes an amplication stage for the input signal. Transistor $T_1$ has base, collector and emitter electrodes 14, 15 and 16 respectively. The input signal is applied to base 14 through a blocking capacitor 17. Base 14 is connected to ground through a resistor 18 and to B+ through a resistor 19. Emitter 16 is connected to B+ through two serially connected resistors 20 and 21. A capacitor 22 is connected from between resistors 20 and 21 to ground. Collector 15 is connected to a parallel resonant circuit 23 comprising a capacitor 24 and a primary winding 25. A tap from winding 25 is connected through a load resistor 26 to ground. Parallel resonant circuit 23 is tuned to the frequency of the pilot carrier in the composite signal, i.e. to 19 kc./s.

An attenuating circuit for attenuating the $L+R$ component of the amplified signal developed across resistor 26 consists of serially connected resistors 27, 28 and 29 and a capacitor 30 shunting resistor 27. The attenuating circuit is connected across resistor 26, and a blocking capacitor 31 is provided.

A filter for rejecting any S.C.A. in the signal from the attenuating circuit is provided by the parallel combination of an inductor 32 and a capacitor 33, the output terminal 34 of the parallel combination being connected to ground through a capacitor 35, while the input terminal 34*a* of the parallel combination is connected between resistor 28 and the parallel combination of resistor 27 and capacitor 30. The filter is adjusted for 67 kc./s. rejection.

A parallel resonant circuit 36 tuned to the frequency of the pilot carrier (19 kc./s.) in the composite signal consists of a capacitor 37 and a secondary winding 38 magnetically coupled to primary winding 25.

A frequency modifier, in this case a frequency doubler, is formed by a transistor $T_2$ and associated circuitry.

Transistor $T_2$ has base, collector and emitter electrodes 39, 40 and 41 respectively. Base electrode 39 is connected to a tap on secondary winding 38. Collector electrode 40 is connected to ground through a parallel resonant circuit 42 consisting of a capacitor 43 and a primary winding 44. Parallel resonant circuit 42 is tuned to the frequency of the suppressed carrier (38 kc./s.), i.e., to twice the frequency of the pilot carrier. Emitter 41 is connected through a resistor 45 which serves to increase the base input resistance of transistor $T_2$ and a variable resistor 46 to B+. A capacitor 47 is connected from between resistors 45 and 46 to ground. Capacitor 47 also is connected to parallel resonant circuit 36.

A Schmitt trigger circuit consisting of two transistors $T_3$ and $T_4$ and associated circuitry is provided. Transistor $T_3$ has base, collector and emitter electrodes 48, 49 and 50 respectively, while transistor $T_4$ also has base, collector and emitter electrodes 51, 52 and 53 respectively. Base 51 is connected through a resistor 54 to B+ and to resistor 46. Collector 52 and base 51 are connected by a capacitor 55. Emitters 50 and 53 are connected, as are collector 49 and base 51, the latter connection being through a resistor 56. A lamp 57 is connected between ground and collector 49. Connected between B+ and emitters 50 and 53 is a resistor 58. Collector 52 is connected to a point between resistors 28 and 29.

A stereophonic detector which functions to derive individual L and R audio signals from the FM multiplex signal applied thereto is shown at 59. Detector 59 consists of four diodes 60, 61, 62 and 63, four diode load circuits 64*a*, 64*b*, 65*a* and 65*b*, two bridged-T circuits 66 and 67, resistors 68, 69, 70 and 71, a secondary winding 72 magnetically coupled to primary winding 44, and a resistor 73.

Diodes 60 and 61 are connected in series aiding relationship through load circuits 64*a* and 64*b*, which consist of resistors 74 and 75 each shunted by capacitors 76 and 77 respectively, and in series with secondary winding 72. Diodes 62 and 63 are connected in series aiding relationship through load circuits 65*a* and 65*b*, which consist of resistors 78 and 79 each shunted by capacitors 80 and 81 respectively, and in series with secondary winding 72. The corresponding components in the two load circuits 64 and 65 have the same values. Resistor 73 is connected between load circuits 64*b* and 65*b*. The signal from the S.C.A. filter is applied to detector 59 via the two resistors 70 and 71 which are of the same value and which are connected in series with each other across secondary winding 72.

In the two bridged-T networks 66 and 67 corresponding components have the same value, and each network consists of a resistor 82 connected between ground and a point intermediate two capacitors 83 and 84, which themselves are connected across a resistor 85, the latter two resistors being connected to the L and R output terminals 11 and 12. Resistors 68 and 69, which are of the same value, both have one terminal connected to ground, the other terminals of each being connected between the respective diode load circuits 64*a*, 64*b* and 65*a*, 65*b* and resistors 85. Stereophonic detector 59 is symmetrical, as will be understood from the foregoing.

In order to describe the operation of the stereophonic decoder, it will be assumed firstly that an ordinary monophonic FM signal is applied to input terminal 10. This signal is amplified by transistor $T_1$, and the amplified signal is developed across resistor 26. No signal is developed across primary winding 25 because there is no pilot carrier, and hence no signal is applied to base 39 of transistor $T_2$. Transistor $T_2$ is biased to collector current cut-off. Since transistor $T_2$ is cut-off, no voltage is developed across resistor 46. Under these circumstances transistor $T_3$ is cut-off, so that lamp 57 is not lit, while transistor $T_4$ is fully conductive in its saturation region. When transistor $T_4$ is fully conductive, the point between resistors 28 and 29 to which collector 52 is connected is effectively connected to B+. This has two effects. The attenuation of the attenuating circuit is increased approximately 4 db by the shunting of resistor 29, which, illustratively, has a value of 680Ω, by resistor 58, which illustratively, has a value of 180Ω. This is a necessary effect, so far as detection efficiency is concerned, that is required to equalize the output levels of monophonic signals to those of multiplex signals and is over and above the effect of the attenuation circuit in attenuating the $L+R$ component of multiplex signals. Secondly, the monophonic signal path is elevated in potential to B+, so that diodes 60 and 63 are forward biased and become fully conductive. Thus, monophonic signals from the attentuating circuit pass through stereophonic detector 59 undistorted via diodes 60 and 63 and resistors 74 and 85, and 78 and 85 respectively and appear identically at output terminals 11 and 12.

Simultaneously, due to the forward bias of diodes 60 and 63, supersonic noise in the passband of 38 kc./s. appearing across winding 72 remains undetected and inaudible, thus preserving the inherently more favourable signal-to-noise ratio of monophonic transmissions.

However, when a multiplex signal is applied to input terminal 10, the pilot carrier is selectively amplified across primary winding 25 and thus is applied to base 39 of transistor $T_2$. Due to the operation of transistor $T_2$ at collector current cut-off, this signal is rectified and its second harmonic (38 kc./s.) is developed across primary winding 44 and coupled into detector 59 via secondary winding 72. Simultaneously an amplified, rectified and smoothed voltage, the level of which is dependent upon the strength of the pilot carrier, appears across resistor 46. The trigger circuit is such that for voltages developed across resistor 46 in excess of a predetermined magnitude, the trigger circuit switches, transistor $T_3$ becoming conductive in its saturation region, while transistor $T_4$ cuts off. When transistor $T_3$ becomes conductive, lamp 57 lights indicating that an FM multiplex signal is being received. Transistor $T_4$ being cut-off, the appropriate attenuation conditions for multiplex signals are restored, and the forward bias on diodes 60 and 63 is removed.

The amplified and filtered, composite signal with attenuated $L+R$ component is supplied to detector 59 via resistors 70 and 71. When the terminal of winding 72 connected to diodes 60 and 62 becomes positive, diodes 60 and 61 conduct, and the left channel audio signal consequently appears at output terminal 11. Similarly, when the terminal of winding 72 connected to diodes 63 and 61 becomes positive, diodes 62 and 63 conduct, and the right channel audio signal consequently appears at output terminal 12.

The function of the bridged-T networks is to null out any residual 38 kc./s. signal and to provide de-emphasis.

Capacitor 55 serves to minimize audible clicks during switching of the trigger circuit.

Resistor 46 may be adjusted to allow variation in the minimum signal level required to switch the trigger circuit for any setting of resistor 45.

While a preferred embodiment of this invention has been set out in detail herein, those skilled in the art will appreciate that changes and modifications may be made therein without departing from the spirit and scope of this invention as defined in the appended claims.

What I claim as my invention is:

1. In an FM receiver, means for obtaining separate L and R audio frequency signals from a composite signal containing a monophonic signal ($L+R$), a pilot carrier and the sideband frequencies of an amplitude modulated carrier suppressed carrier amplitude modulated by an $L-R$ signal, said amplitude modulated carrier being of a frequency harmonically related to said pilot carrier comprising, amplifying means for amplifying said composite signal, attenuating means for attenuating said $L+R$ component of the amplified composite signal, means for conducting said amplified composite signal from said amplifying means to said attenuating means, a stereophonic detector for deriving individual L and R signals from the amplified composite signal with attenuated $L+R$ component, means for conducting the amplified composite signal with attenuated $L+R$ component from said attenuating means to said stereophonic detector, selective amplifying means for selectively amplifying said pilot carrier, a frequency modifier for rectifying the selectively amplified pilot carrier and for modifying the frequency thereof to the suppressed carrier frequency of said amplitude modulated carrier, said frequency modifier including a first transistor for rectifying the selectively amplified pilot carrier, means for biasing said first transistor to collector current cut-off means for conducting the selectively amplified pilot carrier from said selective amplifying means to said frequency modifier, means for conducting the selectively amplified and rectified pilot carrier of modified frequency from said frequency modifier to said stereophonic detector, a trigger circuit comprising second and third transistors, means for conducting the selectively amplified and rectified pilot carrier from said first transistor to said trigger circuit, means electrically connecting said second transistor and said attenuating means, said second transistor being cut-off and said third transistor being conductive when the selectively amplified and rectified pilot carrier is in excess of a predetermined magnitude, said second transistor being conductive and said third transistor being cut-off when the selectively amplified and rectified pilot carrier is below said predetermined magnitude, and means for increasing the attenuation of said attenuating means when said second transistor is conductive.

2. The invention according to claim 1 including visual indicating means, and means for electrically connecting said visual indicating means to said third transistor for energizing said visual indicating means when said third transistor is conductive.

3. The invention according to claim 1 wherein said composite signal includes a subsidiary carrier, and wherein said means for conducting the amplified composite signal with attenuated $L+R$ component from said attenuating means to said stereophonic detector includes filter means for filtering said subsidiary carrier from the amplified composite signal with attenuated $L+R$ component.

4. The invention according to claim 1 wherein said stereophonic detector comprises four diodes, and diode load circuits, a first two of said diodes being connected in series aiding relationship through one of said diode load circuits, the other two of said diodes being connected in series aiding relationship through an other of said diode load circuits, said means for conducting the selectively amplified and rectified pilot carrier of modified frequency from said frequency modifier to said stereophonic detector comprising the secondary winding of a transformer, said secondary winding having two terminals and being connected in series with said first two of said diodes and in series with said other two of said diodes, said means for conducting the amplified composite signal with attenuated $L+R$ component to said stereophonic detector comprising means electrically connecting said attenuating means to opposite ones of said terminals of said secondary winding.

5. The invention according to claim 2 wherein said stereophonic detector comprises four diodes, and diode load circuits, a first two of said diodes being connected in series aiding relationship through one of said diode load circuits, the other two of said diodes being connected in series aiding relationship through an other of said diode load circuits, said means for conducting the selectively amplified and rectified pilot carrier of modified frequency from said frequency modifier to said stereophonic detector comprising the secondary winding of a transformer, said secondary winding having two terminals and being connected in series with said first two of said diodes and in series with said other two of said diodes, said means for conducting the amplified composite signal with attenuated $L+R$ component to said stereophonic detector comprising means electrically connecting said attenuating means to opposite ones of said terminals of said secondary winding.

6. The invention according to claim 5 wherein said composite signal includes a subsidiary carrier, and wherein said means for conducting the amplified composite signal with attenuated $L+R$ component from said attenuating means to said stereophonic detector includes filter means for filtering said subsidiary carrier from the amplified composite signal with attenuated $L+R$ component.

7. The invention according to claim 6 wherein said amplifying means comprise a fourth transistor, said attenuating means comprise a plurality of resistors connected in series and a capacitor connected in parallel with one of said resistors, said selective amplifying means comprise a parallel resonant circuit tuned to the frequency of said pilot carrier and wherein said frequency modifier includes a circuit parallel resonant at the suppressed carrier frequency of said amplitude modulated carrier.

8. In an FM receiver, means for obtaining separate L and R audio frequency signals from a composite signal containing a monophonic signal ($L+R$), a pilot carrier and the sideband frequencies of an amplitude modulated carrier suppressed carrier amplitude modulated by an $L-R$ signal, said amplitude modulated carrier being of a frequency harmonically related to said pilot carrier comprising, attenuating means for attenuating said $L+R$ component of said composite signal, a stereophonic detector for deriving individual L and R signals from the composite signal with attenuated $L+R$ component, means for applying said composite signal to said attenuating means, means for conducting the composite signal with attenuated $L+R$ component from said attenuating means to said stereophonic detector, selective amplifying means for selectively amplifying said pilot carrier, a frequency modifier for rectifying the selectively amplified pilot carrier and for modifying the frequency thereof to the suppressed carrier frequency of said amplitude modulated carrier, said frequency modifier including a first transistor for rectifying the selectively amplified pilot carrier, means for biasing said first transistor to collector current cut-off, means for conducting the selectively amplified pilot carrier from said selective amplifying means to said frequency modifier, means for conducting the selectively amplified and rectified pilot carrier of modified frequency from said frequency modifier to said stereophonic detector, a trigger circuit comprising second and third transistors, means for conducting the selectively amplified and rectified pilot carrier from said first transistor to said trigger circuit, means electrically connecting said second transistor and said attenuating means, said second transistor being cut-off and said third transistor being conductive when the selectively amplified and rectified pilot carrier is in excess of a predetermined magnitude, said second transistor being conductive and said third transistor being cut-off when the selectively amplified and rectified pilot carrier is below said predetermined magnitude, and means for increasing the attenuation of said attenuating means when said second transistor is conductive.

9. The invention according to claim 8 including visual indicating means, and means for electrically connecting said visual indicating means to said third transistor for energizing said visual indicating means when said third transistor is conductive.

10. The invention according to claim 8 wherein said stereophonic detector comprises four diodes, and diode load circuits, a first two of said diodes being connected in series aiding relationship through one of said diode load circuits, the other two of said diodes being connected in series aiding relationship through an other of said diode load circuits, said means for conducting the selectively amplified and rectified pilot carrier of modified frequency from said frequency modifier to said stereophonic detector comprising the secondary winding of a transformer, said secondary winding having two terminals and being connected in series with said first two of said diodes and in series with said other two of said diodes, said means for conducting the composite signal with attenuated $L+R$ component to said stereophonic detector comprising means electrically connecting said attenuating means to opposite ones of said terminals of said secondary winding.

11. The invention according to claim 8 wherein said stereophonic detector comprises four diodes, and diode load circuits, a first two of said diodes being connected in series aiding relationship through one of said diode load circuits, the other two of said diodes being connected in series aiding relationship through an other of said diode load circuits, said means for conducting the selectively amplified and rectified pilot carrier of modified frequency from said frequency modifier to said stereophonic detector comprising the secondary winding of a transformer, said secondary winding having two terminals and being connected in series with said first two of said diodes and in series with said other two of said diodes, said means for conducting the composite signal with attenuated $L+R$ component to said stereophonic detector comprising means electrically connecting said attenuating means to opposite ones of said terminals of said secondary winding, and wherein said attenuating means comprise a plurality of resistors connected in series and a capacitor connected in parallel with one of said resistors, said selective amplifying means comprise a parallel resonant circuit tuned to the frequency of said pilot carrier and wherein said frequency modifier includes a circuit parallel resonant at the suppressed carrier frequency of said amplitude modulated carrier.

References Cited by the Examiner

UNITED STATES PATENTS 3,250,857 5/1966 De Vries et al. ------- 179—15

ROBERT L. GRIFFIN, *Primary Examiner.*